United States Patent
Takano et al.

(10) Patent No.: US 6,204,639 B1
(45) Date of Patent: Mar. 20, 2001

(54) BATTERY CHARGER DETERMINING CHARGING CONDITIONS DEPENDING UPON WHETHER A COOLING DEVICE IS PROVIDED

(75) Inventors: Nobuhiro Takano; Yoshio Iimura; Yukihiro Shima; Kenrou Ishimaru, all of Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/514,184

(22) Filed: Feb. 28, 2000

(30) Foreign Application Priority Data

Feb. 26, 1999 (JP) .................................................. 11-050079
Jan. 6, 2000 (JP) .................................................. 12-000608

(51) Int. Cl.$^7$ .................................................. H01M 10/46
(52) U.S. Cl. .......................................................... 320/150
(58) Field of Search .................................. 320/110, 150, 320/153, 156, 161, 163

(56) References Cited

U.S. PATENT DOCUMENTS 4,229,687 * 10/1980 Newman .
5,606,239 * 2/1997 Schumann .

FOREIGN PATENT DOCUMENTS 0 920 105    6/1999    (EP) .
0 940 864    9/1999    (EP) .
11-339861   12/1999   (JP) .

* cited by examiner

*Primary Examiner*—Edward H. Tso
(74) *Attorney, Agent, or Firm*—Sughrue, Mion, Zinn, Macpeak & Seas, PLLC

(57) ABSTRACT

To provide inexpensive and economic battery chargers with excellent productivity, a control circuit board for the battery charger is produced so as to be usable in common for both the battery chargers with a cooling device and the battery chargers without a cooling device. In the control circuit board, a cooling device detection circuit is provided for detecting whether or not the cooling device is provided. An average charge current to be applied to a battery pack to be charged is controlled depending on whether or not the cooling device is provided. The average charge current is further controlled depending on the type of the battery pack, i.e., whether it is of a small rated capacity or of a large rated capacity, and on a rate of change in battery temperature at the time of start of charging.

16 Claims, 3 Drawing Sheets

BATTERY CHARGER DETERMINING CHARGING CONDITIONS DEPENDING UPON WHETHER A COOLING DEVICE IS PROVIDED

BACKGROUND OF THE INVENTION

1. Field of the Invention

The present invention relates to a battery charger for charging batteries that are used as the power source of a portable device, such as a cordless power tool. Examples of batteries include nickel cadmium batteries, and nickel hydrogen batteries

2. Description of the Related Art

Recently, nickel cadmium batteries, nickel hydrogen batteries, and other secondary batteries are being produced with a large capacity and improved charge characteristic when charged with a large current.

The cycle life of a battery can be reduced if the battery is allowed to overheat during charge. To prevent this potential reduction in cycle life, battery chargers stop charging operations, once the subject battery has heated up to a predetermined temperature, of 60° C. for example. However, large capacity batteries generate more heat when charged than do batteries with a smaller rated capacity. When large rated capacity batteries are charged using the same large charge current as used for charging small rated capacity batteries, then large rated capacity batteries heat up and exceed the predetermined temperature before being fully charged. Because the charging operations are stopped at this point, the battery is less than fully charged.

For this reason, a battery charger has been proposed that charges small rated capacity batteries using a relatively large charge current and charges large rated capacity batteries using a relatively small charge current. However, such a battery charger takes a long time to charge large rated capacity batteries.

Another charger is provided with cooling device, such as a cooling fan, for cooling down the battery while it is being charge. With this configuration, even large rated capacity batteries can be quickly charged using a relatively large charge current without damaging the battery. However, this type of battery charger is, as a matter of course, more expensive than battery chargers without cooling device, and so is unappealing to users that only rarely need to charge large rated capacity batteries. Further, battery chargers without cooling device are quite capable of properly charging large rated capacity batteries, although they require longer to do so. Therefore, there is no absolute necessity for battery chargers to have cooling device. For such reasons, both battery chargers with cooling device and battery chargers without cooling device are present on the market. This requires a manufacturer or retailer to provide various support, such as repair and maintenance support, for both battery chargers with cooling device and battery chargers without cooling device. Also, producing both types is not very economical, and productivity is poor.

SUMMARY OF THE INVENTION

It is an objective of the present invention to overcome the above-described problems, and enable producing both types of battery charger using a common control circuit board, thus providing an inexpensive and economic battery charger with excellent productivity.

The present invention achieves the above-described objectives by detecting whether a battery charger includes cooling device, and changing the charging current in accordance with the detection results.

In accordance with the present invention, there is provided a battery charger including a microcomputer, a charge current supplying section for supplying a charge current to a battery pack to be charged, a connector to which a cooling device is optionally connectable, a cooling device detection circuit, and a charge current control section. The cooling device detection circuit is operatively connected to the microcomputer and the connector and detects whether or not the cooling device is connected to the connector. The cooling device detection circuit outputs a first signal to the microcomputer when the cooling device is connected to the connector and a second signal to the microcomputer when the cooling device is not connected to the connector. The charge current control section is operatively connected to the microcomputer and the charge current supplying section. The microcomputer instructs the charge current control section to control an average charge current to be applied to the battery pack during charging of the battery pack in response to outputs from the cooling device detection circuit.

Further, a battery type distinction circuit is operatively connected to the microcomputer and the battery pack for identifying types of the battery packs classified in terms of rated capacity, e.g., whether the battery pack is of a large rated capacity or a small rated capacity. The battery type distinction circuit outputs a type indication signal to the microcomputer. Then, the microcomputer instructs the charge current control section to control the average charge current in further response to the type indication signal.

Specifically, the microcomputer instructs the charge current control section to use a first charge current in response to the first signal and to use a second charge current in response to the second signal and when the type indication signal indicates that the battery pack is of a large rated capacity. In this case, the first charge current has an average level larger than an average level of the second charge current. In the case where the cooling device is not detected, the small rated capacity battery packs may not necessarily be charged with the first charge current but be charged with a third charge current that has an average level between the levels of the first charge current and the second charge current. However, the microcomputer may instruct the charge current control section to use the first charge current in response to the second signal and when the type indication signal indicates that the battery pack is of a small rated capacity.

It is preferable to have a battery temperature detection circuit that is operatively connected to the microcomputer for detecting a temperature of battery cells contained in the battery pack. The battery temperature detection circuit outputs a temperature signal indicative of the temperature of the battery cells to the microcomputer. Then, the microcomputer instructs the current setting circuit to decrease the average charge current when the microcomputer determines that a battery temperature gradient per a unit time is greater than a predetermined value at the time of start of the charging operation.

The microcomputer instructs the current setting circuit to maintain the average charge current when the battery temperature gradient per the unit time is greater than the predetermined value at the time of start of the charging operation and when the type indication signal indicates that the battery pack is of a small rated capacity.

Further, the microcomputer instructs the current setting circuit to decrease the average charge current when the microcomputer determines that a battery temperature gradient per a unit time is greater than a predetermined value at the time of start of the charging operation and when the type indication signal indicates that the battery pack is of a large rated capacity.

The present invention as configured above is applicable to battery chargers for charging battery packs with and without a cooling device.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE PREFERRED EMBODIMENTS

A battery charger according to the preferred embodiment of the present invention will be described while referring to the accompanying drawings.

Figure 1:
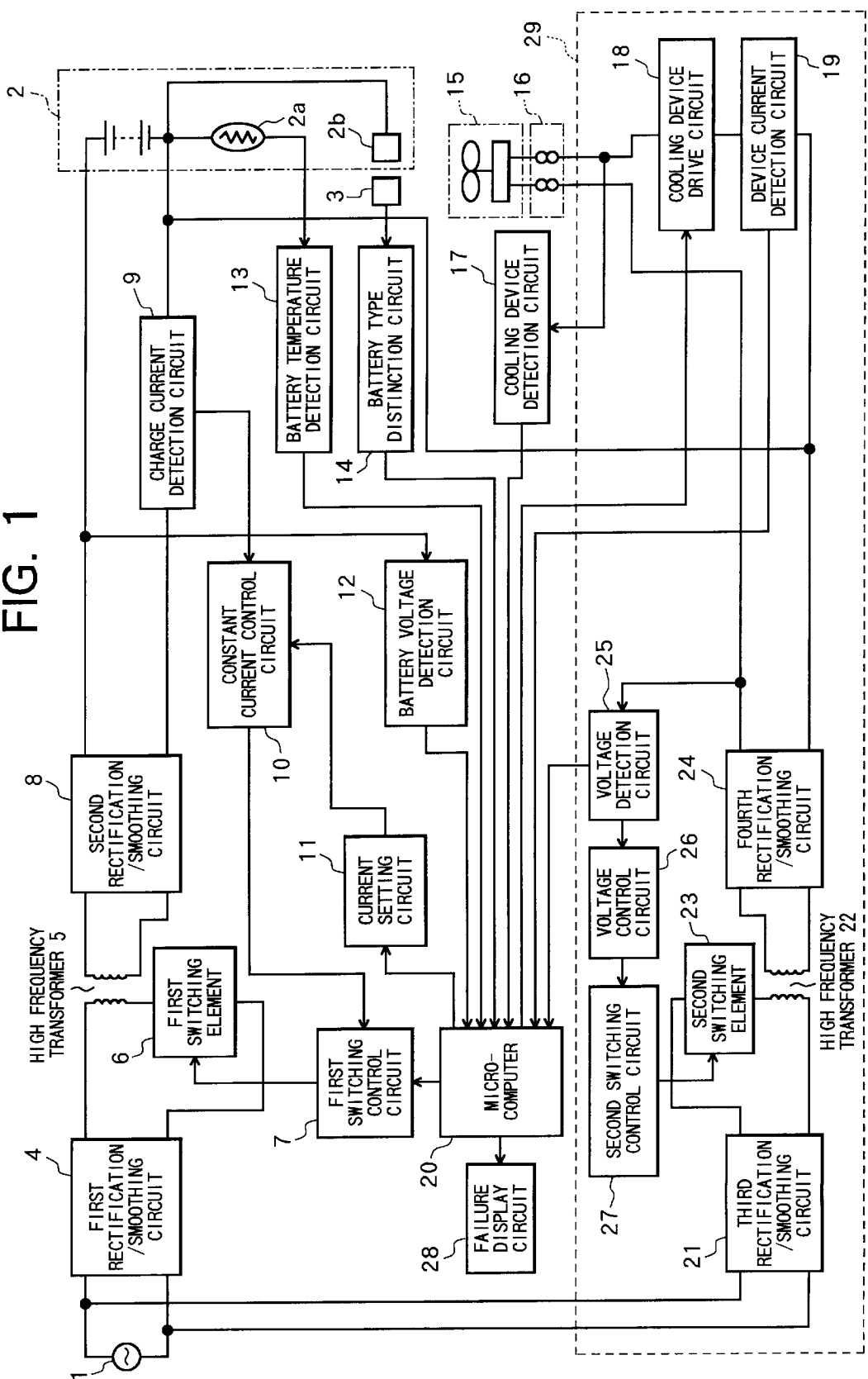
FIG. 1 is a block diagram showing circuitry of a battery charger according to an embodiment of the present invention.

FIG. 1 is a block diagram showing a battery charger according to the preferred embodiment. The battery charger is for charging a battery pack 2 using power supplied from an AC power source 1. The battery pack 2 includes a plurality of chargeable battery cells connected in series, a temperature detection element 2a, such as a thermistor, provided in contact with or in proximity to the battery cells, and a distinction terminal 2b for enabling distinction of the type of the battery pack 2. According to the present embodiment, the distinction terminal 2b is provided only to battery packs 2 that have a large rated capacity whereas the distinction terminal 2b is not provided to battery packs 2 that have a small rated capacity. Therefore, depending on whether the battery packs 2 have the distinction terminal 2b, the type of battery pack 2 can be determined. The battery charger includes a distinction terminal 3. The distinction terminal 2b of the battery pack 2 is brought into contact with the distinction terminal 3 when the battery pack 2 is properly loaded to the battery charger.

A cooling device 15 such as a fan can be provided in the battery charger. Whether the cooling device 15 is to be provided in the battery charger can be determined according to manufacturer's or user's intention. The cooling device 15 is for cooling the battery pack 2 during battery charge. A connector 16 is provided in the battery charger for detachably connecting the cooling device 15. The connector 16 is connected to a cooling device drive power source 29 provided internally of the battery charger.

The battery charger includes a first high frequency transformer 5, a first rectification/smoothing circuit 4 on the primary coil side of the first high frequency transformer 5, a first switching element 6, such as a field effect transistor (FET), connected between the first rectification/smoothing circuit 4 and the primary coil of the first high frequency transformer 5, and a second rectification/smoothing circuit 8 on the secondary coil side of the first high frequency transformer 5. The battery pack 2 is connectable to the output of the second rectification/smoothing circuit 8.

A microcomputer 20 is provided for controlling overall charging and cooling operations of the battery charger. The microcomputer 20 is operatively connected to a first switching control circuit 7, a current setting circuit 11, a cooling device drive circuit 18, and a failure display circuit 28 for controlling these circuits. The first switching control circuit 7 is connected to the first switching element 6 and changes the drive pulse width of the first switching element 6 to adjust the output voltage of the second rectification/smoothing circuit 8. The first switching control circuit 7 also performs controls to start and stop the charging process based on output from the microcomputer 20. The current setting circuit 11 sets the level of current to be supplied to the battery in response to instructions from the microcomputer 20. The cooling device drive circuit 18 is provided for starting and stopping drive of the cooling device 15. The failure display circuit 28 can be a light emitting diode (LED), and is for displaying that the cooling device 15 or some other component has failed or entered an error condition. For example, when the microcomputer 20 detects that the level of current flowing from the output of a device current detection circuit 19 to the cooling device 15 is outside a predetermined range, then the microcomputer 20 judges that a failure or error condition exists in or near the cooling device 15, and operates the failure display circuit 28 accordingly.

A variety of components are connected to the microcomputer 20 so that the latter can gather necessary information for controlling the first switching control circuit 7, the current setting circuit 11, the cooling device drive circuit 18, and the failure display circuit 28. These components include a battery voltage detection circuit 12, a battery temperature detection circuit 13, a battery type distinction circuit 14, a cooling device detection circuit 17, the device current detection circuit 19, and a voltage detection circuit 25.

The battery voltage detection circuit 12 is connected to the battery pack 2 to detect the voltage across the battery. The battery temperature detection circuit 13 is connected to the output of the temperature detection element 2a. The resistance of the temperature detection element 2a changes depending on the sensed temperature, then the battery temperature detection circuit 13 converts the resistance value of the temperature detection element 2a into a voltage and outputs the voltage representative of the temperature of the battery pack 2 to the microcomputer 20.

The battery type distinction circuit 14 is connected to the distinction terminal 3 and switches voltage applied to the microcomputer 20 depending on whether a connection is established between the distinction terminal 2b of the battery pack 2 and the distinction terminal 3 of the battery charger.

The cooling device detection circuit 17 is connected to the connector 16 for detecting whether the cooling device 15 is actually connected to the battery charger. According to the present embodiment, the cooling device detection circuit 17 detects whether a voltage is developed between the connector 16 and the cooling device drive circuit 18 to determine whether the cooling device 15 is attached to the battery charger.

The device current detection circuit 19 is a component of the cooling device drive power source 29, which detects current flowing to the cooling device 15. The microcomputer 20 controls charge and cooling operations depending on output from the battery voltage detection circuit 12, the battery temperature detection circuit 13, the battery type distinction circuit 14, cooling device detection circuit 17, the device current detection circuit 19, and a voltage detection circuit 25.

The battery charger further includes a charge current detection circuit 9 for detecting the charge current flowing to the battery pack 2, and a constant current control circuit 10 connected between the output of the charge current detection circuit 9 and the first switching control circuit 7 for performing control operations to maintain the charge current to a predetermined level. The constant current control circuit 10 is configured from an operational amplifier, for example.

In accordance with output from the microcomputer 20, the current setting circuit 11 outputs a reference voltage that corresponds to a predetermined charge current level, to the constant current control circuit 10. The constant current control circuit 10 then controls, via the first switching control circuit 7 and the first switching element 6, to maintain the charge current to a constant level, so that the current detected by the charge current detection circuit 9 is maintained equivalent to the setting voltage of the current setting circuit 11.

The cooling device drive power source 29 includes a third rectification/smoothing circuit 21, a second high frequency transformer 22, a second switching element 23, a fourth rectification/smoothing circuit 24, the voltage detection circuit 25, a voltage control circuit 26, and a second switching control circuit 27. The cooling device drive power source 29 is provided for generating a predetermined voltage for driving the cooling device 15.

Figure 2:
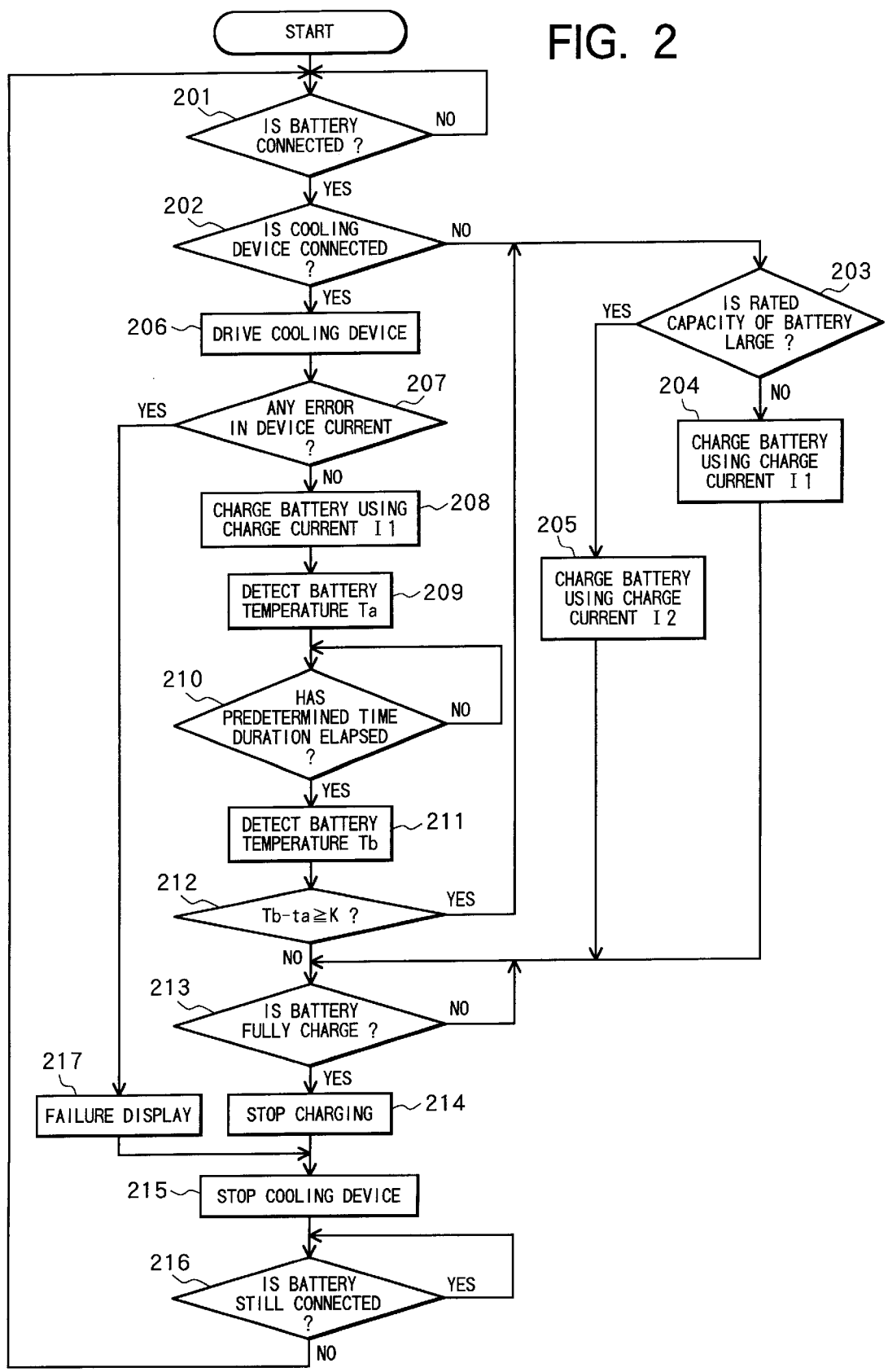
FIG. 2 is a flowchart representing a charge control routine performed by a microcomputer of the battery charger of FIG. 1.

Next, operations of the battery charger according to the preferred embodiment of the present invention will be described while referring to the circuit block diagram of FIG. 1 and the flowchart of FIG. 2. When the battery charger is powered, then in step 201 the microcomputer 20 waits for the battery pack 2 to be connected to the battery charger. Once the battery pack 2 is connected to the battery charger (step 201: YES), then in step 202 the microcomputer 20 judges whether or not the cooling device 15 is connected to the battery charger based on the signal outputted from the cooling device detection circuit 17. When the microcomputer 20 judges that the cooling device 15 is not connected to the battery charger (step 202: NO), then in step 203, the microcomputer 20 receives output from the battery type distinction circuit 14 to judge whether the connected battery pack 2 has a large rated capacity or not. If the connected battery pack 2 does not have a large rated capacity (step 203: NO), then this means that the battery pack 2 has a small rated capacity. A rapid chargeable nickel-cadmium battery chargeable with 1700 mAh, such as used in power tools and the like, is an example of a battery pack 2 with a small rated capacity. When the battery pack 2 has a small rated capacity, it can be properly charged using a large current, even without the cooling device 15 being present. Therefore, in step 204 the microcomputer 20 outputs a signal that corresponds to a charge current I1, such as 5C, to the current setting circuit 11 and also outputs a start charging signal to the first switching control circuit 7, to start charging the battery pack 2 at the charge current I1.

Here, an explanation will be provided for control used to maintain a constant charge current. The charge current detection circuit 9 starts detecting the charge current flowing to the battery pack 2, simultaneously with start of battery charge. The constant current control circuit 10 produces a voltage that corresponds with the current detected by the charge current detection circuit 9. The constant current control circuit 10 compares the voltage with the reference voltage from the current setting circuit 11, and outputs the difference to the first switching control circuit 7 to perform a feedback operation. The first switching control circuit 7 then controls the first switching element 6 to change drive pulse width as required to maintain a constant charge current.

Referring back to the flowchart, if the connected battery pack 2 has a large rated capacity (step 203: YES), then this means that the battery pack 2 might heat up excessively if charged using the large current I1. Such excessive heat can reduce the cycle life of the battery pack 2, or cause charging processes to be cut off too soon. Therefore, the battery pack 2 should be charged using a charge current I2 that is smaller than the charge current I1. The charge current I2 can be 1.5 C for example. As a result, in step 205 the microcomputer 20 outputs a signal that corresponds to the charge current I2 to the current setting circuit 11, and also outputs a start charge signal to the first switching control circuit 7, to start charging the battery pack 2 using the charge current I2. A rapid chargeable nickel hydrogen battery chargeable with 3000 mAh, such as used in power tools and the like, is an example of a battery pack 2 with a large rated capacity.

If the microcomputer 20 judges that the cooling device 15 is connected to the battery charger (step 202: YES), then in step 206 the microcomputer 20 outputs a signal to the cooling device drive circuit 18, indicating to the cooling device drive circuit 18 to drive the cooling device 15.

Once the cooling device 15 is turned ON and starts cooling the battery pack 2, the microcomputer 20 detects in step 207 the level of current flowing to the cooling device 15 based on the output from the device current detection circuit 19, and judges whether or not the level of the current is abnormal. That is, the microcomputer 20 judges whether the level of the current applied to the cooling device 15 falls within a predetermined range.

When the current flowing to the cooling device 15 is outside the predetermined range, that is, when the current level flowing to the cooling device 15 is too high or too low, then in step 207 the microcomputer 20 judges that a failure or error has occurred in the cooling device 15 or peripheral components, and so operates the failure display circuit 28 to display a message indicating that a failure has occurred (step 217). That is, detecting the current that flows to the cooling device 15 makes it possible to determine whether a failure has occurred in the cooling device 15 or other components. Also, the user can easily tell if the cooling device 15 is not operating properly by merely viewing the displayed failure message. For example, if the cooling device 15 is a fan, the user can easily discover when the fan blade is stuck in place and unable to rotate. Simultaneously with alerting the operator that the cooling device 15 or its peripheral components have failed, the microcomputer 20 stops driving of the cooling device 15 (step 215). When the battery pack 2 is removed from the battery charger (step 216: NO), then the routine returns to step 201.

When the microcomputer 20 judges that a proper current is flowing to the cooling device 15 (step 207: NO), then in step 208 the microcomputer 20 starts charging the battery pack 2 at the charge current I1, by outputting a signal that corresponds to the charge current I1 to the current setting circuit 11, and also outputting a charge start signal to the first switching control circuit 7.

Once charging has started, then in step 209 the microcomputer 20 retrieves battery temperature data Ta based on the output from the battery temperature detection circuit 13. After a predetermined duration of time has elapsed (step 210: YES), then in step 211 the microcomputer 20 retrieves battery temperature data Tb based on the output from the battery temperature detection circuit 13. Next, in step 212 the microcomputer 20 uses the formula Tb−Ta to calculate the rise in battery temperature that occurred while the battery pack 2 was being charged at the charge current I1 during the predetermined duration of time, and judges whether the rise in temperature during the predetermined duration of time is equal to or greater than a predetermined value K.

If the microcomputer 20 judges that the battery temperature has increased by the predetermined value K or more (step 212: YES), then the routine proceeds to step 203, whereupon the microcomputer 20 judges whether the battery pack 2 connected to the battery charger is a battery with a large rated capacity. If the battery pack 2 is a battery with a large rated capacity (step 203: YES), then the routine proceeds to step 205, whereupon the charge current used to charge the battery pack 2 is lowered from the charge current I1 to the charge current I2. This configuration takes into account the possibility that problems relating to the cooling device 15 may occur, even when it is detected that a cooling device 15 is connected to the battery charger. For example, when the cooling device 15 is a cooling fan, then one or more air holes should be provided for air to flow from the fan into the battery pack 2. However, some battery packs 2 might not be provided with air holes, so that the cooling effect is poor. Also, even if air holes are provided, the air holes might get clogged up with dust, so that the battery pack 2 can not be properly cooled.

When the microcomputer 20 judges that the battery pack 2 connected to the battery charger is a battery with a small rated capacity (step 203: NO), then this means that the battery pack 2 can be properly charged using a large current, even without cooling. Therefore, in step 204 the microcomputer 20 continues charging the battery pack 2 using the charge current I1.

When the rise in battery temperature is not the predetermined value K or greater (step 212: NO), then this means that the cooling device 15 is effectively cooling the battery pack 2 during the charge process. Therefore, in step 213 the microcomputer 20 continues charging the battery pack 2 using the charge current I1 until it detects that the battery pack 2 has been completely charged.

There are many well-know methods for detecting whether a battery has been fully charged. For example, in a −ΔV detection method, the change in voltage of the battery is observed to detect a voltage peak that appears just before full charge is reached. Full charge is determined once the battery voltage drops by a predetermined amount below the peak voltage. In a second differential detection method, full charge is determined once the second differential value of the time versus battery voltage characteristic curve changes from positive to negative. In a ΔT detection method, the battery temperature is observed from start of charge, and full charge is determined once rise in battery temperature reaches or exceeds a predetermined value. Japanese Laid-Open Patent Publication (Kokai) Nos. SHO-62-193518 and HEI-2-246739, and Japanese Utility-Model Laid-Open Publication (Kokai) No. HEI-3-34638 disclose a ΔT/Δt detection method, wherein the rate of increase in battery temperature per predetermined duration of time, that is, the temperature gradient, is measured, and full charge is determined when the temperature gradient rapidly increases. Any one or combination of these detection methods can be used to determine when the battery pack 2 is fully charged.

The increase in battery temperature will vary depending on various factors, including whether the cooling device 15 is connected to the battery charger, how effectively cooling occurs, and the charge current used for charging. Therefore, when the above-described ΔT detection method, ΔT/Δt detection method, or other method that relies on the battery temperature to determine full charge is used, then different values need to be provided for each different situation.

When the microcomputer 20 judges that the battery pack 2 is fully charged (step 213: YES), then in step 214 the microcomputer 20 stops charging operations by outputting a charging stop signal to the first switching control circuit 7. In step 215, the microcomputer 20 stops the cooling device 15 by outputting a signal to the cooling device drive circuit 18, commanding the cooling device drive circuit 18 to stop driving the cooling device 15. Then in step 216, the microcomputer 20 determines whether the battery pack 2 has been removed from the battery charger. Once the battery pack 2 has been removed from the battery charger (step 216: NO), then the routine returns to step 201, whereupon the microcomputer 20 waits for another battery pack 2 to be connected to the battery charger.

The above-described configuration can be used regardless of whether the battery charger includes the cooling device 15 or not. In other words, all components of the battery charger are the same except for the cooling device 15. Therefore, the battery charger can be economically produced with good productivity. That is, because the charging process is controlled according to whether or not a cooling device 15 is detected, the same control board can be used for two different types of battery charger, that is, for battery chargers with a cooling device and battery chargers without a cooling device. The economics and productivity of producing the battery chargers can be improved, so that the battery chargers can be less expensively produced.

Also, because the charging process is controlled according to whether or not a cooling device 15 is detected, charging operations can be properly controlled even if the cooling device 15 is later attached to a battery charger that did not originally include the cooling device 15.

As described above, the rise in battery temperature during the predetermined duration of time is detected in steps 209 to 212. If the rise in battery temperature reaches or exceeds a predetermined value, it is determined that for some reason the cooling device 15 is not effectively cooling the battery pack 2. At this point, the charge current is lowered from the charge current I1 to the charge current I2. This configuration can deal with situations wherein the battery pack 2 is not properly cooled even though the cooling device 15 is driven. For example, when the cooling device 15 is a cooling fan, the cooling fan might not be able to properly cool the battery pack 2 because air holes that are supposed to let the cooling air flow to the battery pack 2 are clogged up with dust, or because the battery pack 2 is not provided with air holes. Also, battery temperature rises dramatically once a battery pack 2 is fully charged or when the battery pack 2 is near the end of its life. With the above-described configuration, the charge current can be lowered in either of these conditions, so that the cycle life of the battery pack can be improved.

According to the embodiment, the charge current is changed depending on whether the cooling device 15 is attached or not, and on whether the battery pack 2 has a large or small rated capacity. However, the present invention is not limited to such a configuration. The basic concept of the present invention is to control the amount of heat generated during charging, to prevent batteries from being undercharged, and to prevent shortening of the cycle life of batteries, in both battery chargers that include the cooling device 15 and battery chargers that do not include the cooling device 15. The present invention also improves ease of operation of the battery charger in situation when the cooling device 15 is attached. Small rated capacity batteries, which generate an extremely low amount of heat during charging, can be charged using a large charge current regardless of whether the battery charger has a cooling device 15. It should be noted that even when the cooling device 15 is attached, the battery charger can be controlled so as to disable the cooling device 15 when it is judged that the connected battery has a low rated capacity.

In the embodiment, the charge current is controlled depending on both whether the cooling device 15 is attached and on whether the battery's rated capacity is judged to be large or small. However, the charge current can be controlled by only determining whether the cooling device 15 is attached or not, without judging the rated capacity of the battery.

In the embodiment, the battery charger charged the battery pack 2 using a constant current. However, the present invention can also be applied to battery chargers that sequentially change charge currents during the charge process in accordance with the battery voltage or the battery temperature. With such battery chargers, a larger average charge current can be used when the cooling device 15 is connected than when the cooling device 15 is not connected. The average charge current can be controlled by controlling, for example, the time that larger charge currents are used to charge the battery pack 2, depending on whether or not the cooling device 15 is attached. That is, if the cooling device 15 is provided, then larger charge currents can be used for longer periods of time without fear of overheating the batter pack 2.

Figure 3:
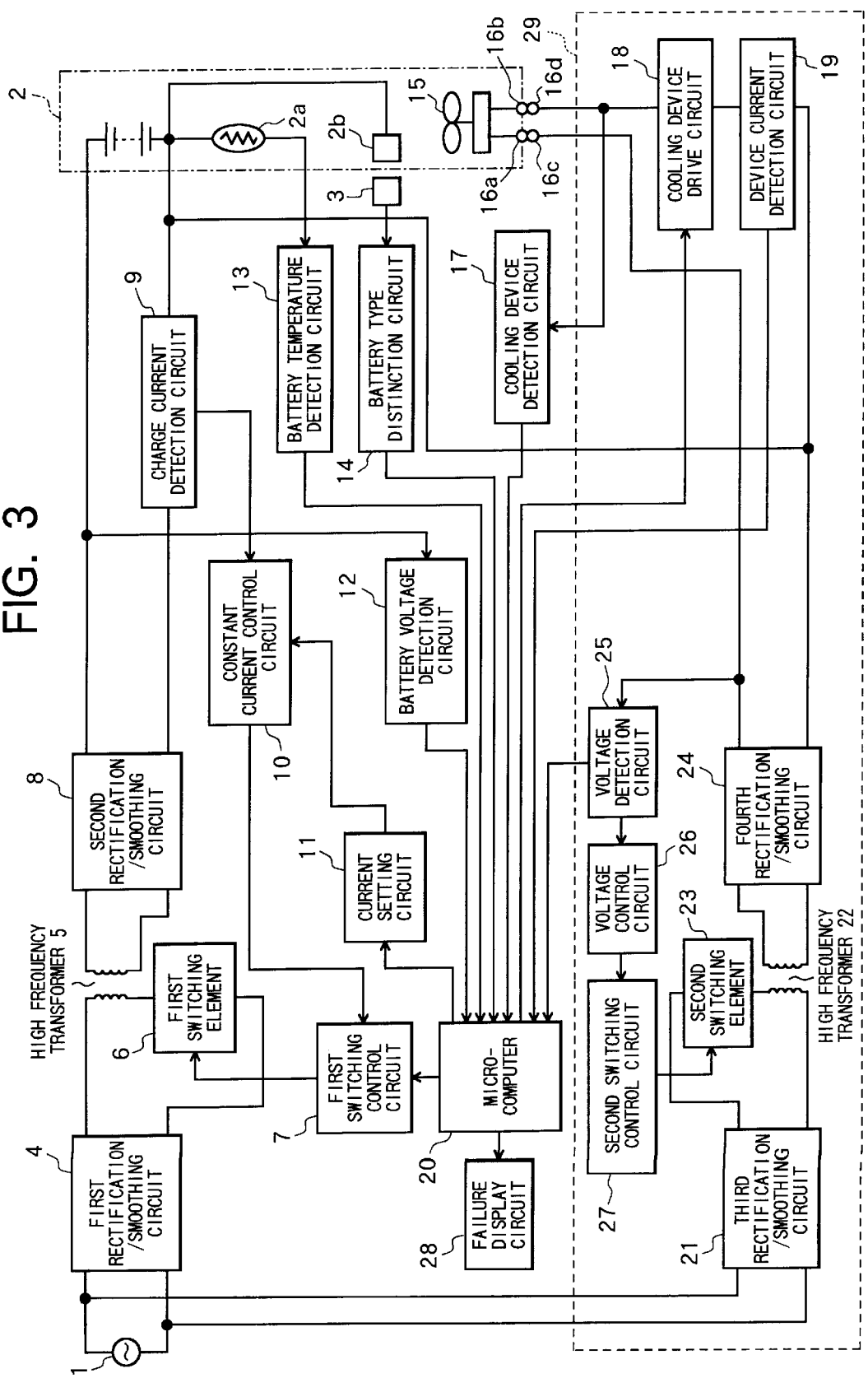
FIG. 3 is a block diagram showing circuitry of a battery charger according to another embodiment of the present invention.

FIG. 3 is a block diagram showing circuitry of a battery charger according to another embodiment of the present invention. The battery charger shown in FIG. 3 differs from that shown in FIG. 1 in that the cooling device 15 is housed internally within the battery pack 2. The battery pack 2 shown in FIG. 3 includes the temperature detection element 2a, the distinction terminal 2b, the cooling device 15, and also cooling device drive terminals 16a, 16b. The temperature detection element 2a is a thermistor, and the like provided in contact with or in proximity to the battery cells. The distinction terminal 2b is provided for distinguishing the type of battery cell. The cooling device drive terminals 16a, 16b are for connecting the cooling device 15 with a cooling device drive power source 29. Also, the battery charger is provided with cooling device drive terminals 16c, 16d, which correspond to the cooling device drive terminals 16a, 16b of the battery pack 2.

The battery charger shown in FIG. 3 operates according to the same principles as the battery charger shown in FIG. 1. That is, charge current is controlled depending on whether the cooling device 15 is present in the battery pack 2. When the battery pack 2 is a type that includes the cooling device 15, then the average charge current can be increased. When the battery pack 2 is a type that does not include the cooling device 15, then the average charge current can be reduced. With this configuration, heat generated during charging can be suppressed, insufficient charge of batteries can be prevented, and reduction in the cycle life of batteries can be reduced.

According to the present invention, charging can be controlled as appropriate, depending on whether or not a cooling device is provided. Batteries can be reliably fully charged without insufficient charges occurring. Also, battery chargers both with and without a cooling device can be produced to include the same control board, so that an inexpensive battery charger can be economically and productively produced.

What is claimed is:

1. A battery charger comprising:
a microcomputer;
a charge current supplying section for supplying a charge current to a battery pack to be charged:
   a connector to which a cooling device is optionally connectable, said cooling device operating to cool said battery pack;
   a cooling device detection circuit operatively connected to said microcomputer and said connector, said cooling device detection circuit detecting whether or not said cooling device is connected to said connector and outputting a first signal to said microcomputer when said cooling device is connected to said connector and a second signal to said microcomputer when said cooling device is not connected to said connector; and
   a charge current control section operatively connected to said microcomputer and said charge current supplying section, said microcomputer instructing said charge current control section to control an average charge current to be applied to said battery pack during charging of said battery pack in response to outputs from said cooling device detection circuit.

2. The battery charger according to claim 1, further comprising a battery type distinction circuit operatively connected to said microcomputer and said battery pack, said battery type distinction circuit identifying types of the battery packs classified in terms of rated capacity and outputting a type indication signal to said microcomputer, wherein said microcomputer instructs said charge current control section to control the average charge current in further response to the type indication signal.

3. The battery charger according to claim 2, wherein said microcomputer instructs said charge current control section to use a first charge current to charge said battery pack in response to the first signal from said cooling device detection circuit, and said microcomputer instructs said charge current control section to use a second charge current to charge said battery pack in response to the second signal from said cooling device detection circuit and when the type indication signal indicates that said battery pack is large in rated capacity as compared with a reference rated capacity, the first charge current having an average level larger than an average level of the second charge current.

4. The battery charger according to claim 2, wherein said microcomputer instructs said charge current control section to use a first charge current to charge said battery pack in response to the first signal from said cooling device detection circuit, said microcomputer instructs said charge current control section to use a second charge current to charge said battery pack in response to the second signal from said cooling device detection circuit and when the type indication signal indicates that said battery pack is large in rated capacity as compared with a reference rated capacity, and said microcomputer instructs said charge current control section to use the first charge current to charge said battery pack in response to the second signal from said cooling device detection circuit and when the type indication signal indicates that said battery pack is small in rated capacity as compared with the reference rated capacity, the first charge current having an average level larger than an average level of the second charge current.

5. The battery charger according to claim 1, further comprising a cooling device drive power source; a cooling device drive circuit connected to said connectors and said cooling device drive power source, for driving said cooling device with power supplied from said cooling device drive power source, and a device current detection circuit connected between said cooling device drive power source and said cooling device drive circuit and also connected to said microcomputer, said device current detection circuit detecting a current supplied from said cooling device drive power source to said cooling device and supplying information about the current detected by said device current detection circuit to said microcomputer, wherein said microcomputer determines that said cooling device is in an error condition when the information indicates that the current detected by said device current detection circuit is outside a predetermined range.

6. The battery charger according to claim 2, further comprising a battery temperature detection circuit operatively connected to said microcomputer, said battery temperature detection circuit detecting a temperature of battery cells contained in said battery pack and outputting a temperature signal indicative of the temperature of the battery cells to said microcomputer, wherein said microcomputer instructs said current setting circuit to decrease the average charge current when said microcomputer determines that a battery temperature gradient per a unit time is greater than a predetermined value at the time of start of the charging operation.

7. The battery charger according to claim 6, wherein said microcomputer instructs said current setting circuit to maintain the average charge current when the battery temperature gradient per the unit time is greater than the predetermined value at the time of start of the charging operation and when the type indication signal indicates that said battery pack is small in rated capacity as compared with the reference rated capacity.

8. The battery charger according to claim 2, further comprising a battery temperature detection circuit operatively connected to said microcomputer, said battery temperature detection circuit detecting a temperature of battery cells contained in said battery pack and outputting a temperature signal indicative of the temperature of the battery cells to said microcomputer, wherein said microcomputer instructs said current setting circuit to decrease the average charge current when said microcomputer determines that a battery temperature gradient per a unit time is greater than a predetermined value at the time of start of the charging operation and when the type indication signal indicates that said battery pack is large in rated capacity as compared with the reference rated capacity.

9. A battery charger comprising:

a microcomputer;

a charge current supplying section for supplying a charge current to a battery pack to be charged, said battery pack optionally including a cooling device for cooling a plurality of chargeable cells connected in series and contained in said battery pack;

a cooling device detection circuit operatively connected to said microcomputer for detecting whether or not said cooling device is included in said battery pack, said cooling device detection circuit outputting a first signal to said microcomputer when said cooling device is included in said battery pack and a second signal to said microcomputer when said cooling device is not included in said battery pack; and a charge current control section operatively connected to said microcomputer and said charge current supplying section, said microcomputer instructing said charge current control section to control an average charge current to be applied to said battery pack during charging of said battery pack in response to outputs from said cooling device detection circuit.

10. The battery charger according to claim 9, further comprising a battery type distinction circuit operatively connected to said microcomputer and said battery pack, said battery type distinction circuit identifying types of the battery packs classified in terms of rated capacity and outputting a type indication signal to said microcomputer, wherein said microcomputer instructs said charge current control section to control the average charge current in further response to the type indication signal.

11. The battery charger according to claim 10, wherein said microcomputer instructs said charge current control section to use a first charge current to charge said battery pack in response to the first signal from said cooling device detection circuit, and said microcomputer instructs said charge current control section to use a second charge current to charge said battery pack in response to the second signal from said cooling device detection circuit and when the type indication signal indicates that said battery pack is large in rated capacity as compared with a reference rated capacity, the first charge current having an average level larger than an average level of the second charge current.

12. The battery charger according to claim 10, wherein said microcomputer instructs said charge current control section to use a first charge current to charge said battery pack in response to the first signal from said cooling device detection circuit, said microcomputer instructs said charge current control section to use a second charge current to charge said battery pack in response to the second signal from said cooling device detection circuit and when the type indication signal indicates that said battery pack is large in rated capacity as compared with a reference rated capacity, and said microcomputer instructs said charge current control section to use the first charge current to charge said battery pack in response to the second signal from said cooling device detection circuit and when the type indication signal indicates that said battery pack is small in rated capacity as compared with the reference rated capacity, the first charge current having an average level larger than an average level of the second charge current.

13. The battery charger according to claim 9, further comprising a cooling device drive power source; a cooling device drive circuit connected to said cooling device and said cooling device drive power source, for driving said cooling device with power supplied from said cooling device drive power source, and a device current detection circuit connected between said cooling device drive power source and said cooling device drive circuit and also connected to said microcomputer, said device current detection circuit detecting a current supplied from said cooling device drive power source to said cooling device and supplying information about the current detected by said device current detection circuit to said microcomputer, wherein said microcomputer determines that said cooling device is in an error condition when the information indicates that the current detected by said device current detection circuit is outside a predetermined range.

14. The battery charger according to claim 10, further comprising a battery temperature detection circuit operatively connected to said microcomputer, said battery temperature detection circuit detecting a temperature of battery cells contained in said battery pack and outputting a temperature signal indicative of the temperature of the battery cells to said microcomputer, wherein said microcomputer instructs said current setting circuit to decrease the average charge current when said microcomputer determines that a battery temperature gradient per a unit time is greater than a predetermined value at the time of start of the charging operation.

15. The battery charger according to claim 14, wherein said microcomputer instructs said current setting circuit to maintain the average charge current when the battery temperature gradient per the unit time is greater than the predetermined value at the time of start of the charging operation and when the type indication signal indicates that said battery pack is small in rated capacity as compared with the reference rated capacity.

16. The battery charger according to claim 10, further comprising a battery temperature detection circuit operatively connected to said microcomputer, said battery temperature detection circuit detecting a temperature of battery cells contained in said battery pack and outputting a temperature signal indicative of the temperature of the battery cells to said microcomputer, wherein said microcomputer instructs said current setting circuit to decrease the average charge current when said microcomputer determines that a battery temperature gradient per a unit time is greater than a predetermined value at the time of start of the charging operation and when the type indication signal indicates that said battery pack is large in rated capacity as compared with the reference rated capacity.

* * * * *